United States Patent
Gulliksson et al.

(10) Patent No.: US 9,693,377 B2
(45) Date of Patent: Jun. 27, 2017

(54) AUTOMATIC INTERNET SHARING

(71) Applicant: Sony Corporation, Tokyo (JP)

(72) Inventors: Johan Gulliksson, Bjärred (SE); Lars Novak, Lund (SE); Martin Sjölin, Redwood City, CA (US)

(73) Assignees: SONY MOBILE COMMUNICATIONS INC., Tokyo (JP); SONY CORPORATION, Tokyo (JP)

( * ) Notice: Subject to any disclaimer, the term of this patent is extended or adjusted under 35 U.S.C. 154(b) by 7 days.

(21) Appl. No.: 14/427,590

(22) PCT Filed: Dec. 12, 2013

(86) PCT No.: PCT/IB2013/060882
§ 371 (c)(1),
(2) Date: Mar. 11, 2015

(87) PCT Pub. No.: WO2015/087112
PCT Pub. Date: Jun. 18, 2015

(65) Prior Publication Data
US 2016/0286588 A1  Sep. 29, 2016

(51) Int. Cl.
*H04B 7/00* (2006.01)
*H04W 76/02* (2009.01)
(Continued)

(52) U.S. Cl.
CPC ........ *H04W 76/023* (2013.01); *G06F 13/385* (2013.01); *H04W 4/008* (2013.01); *H04W 88/04* (2013.01); *G06F 2213/3808* (2013.01); *G06F 2213/3814* (2013.01); *H04W 84/042* (2013.01); *H04W 92/18* (2013.01)

(58) Field of Classification Search
CPC ..... H04W 84/18; H04W 88/06; H04W 76/02; H04W 48/18; H04W 8/245; H04W 24/02; H04W 88/08; H04W 80/04; H04M 1/7253; H04M 1/72525; H04M 1/72522; H04B 1/406; H04B 1/005; H04B 1/006
USPC ...... 455/41.2, 418–420, 422.1, 432.1, 435.1, 455/550.1, 552.1; 370/328
See application file for complete search history.

(56) References Cited

U.S. PATENT DOCUMENTS

2010/0267368 A1  10/2010  Masputra
2012/0324067 A1  12/2012  Hari et al.
(Continued)

OTHER PUBLICATIONS

International Search Report, International application No. PCT/IB2013/060882. Date of mailing: Sep. 15, 2014. European Patent Office, Rijswijk, NL.

*Primary Examiner* — Nhan Le
(74) *Attorney, Agent, or Firm* — Coats & Bennett, PLLC

(57) ABSTRACT

Methods of tethering first and second devices to enable the second device to tether to and gain access to a packet data network through the first device. The first device is configured to connect to the packet data network through a first interface. The first and second devices are configured to exchange tethering information, such as through Near Field Communication. With the first device connected to the packet data network using a first interface, the devices are tethered together using a second interface. The second device is then able to access the packet data network through the tethering connection with the first device.

13 Claims, 4 Drawing Sheets

(51) Int. Cl.
*G06F 13/38* (2006.01)
*H04W 88/04* (2009.01)
*H04W 4/00* (2009.01)
H04W 84/04 (2009.01)
H04W 92/18 (2009.01)

(56) References Cited

U.S. PATENT DOCUMENTS

| | | | |
|---|---|---|---|
| 2013/0294306 A1 | 11/2013 | Borges et al. | |
| 2014/0153546 A1* | 6/2014 | Kim | H04W 48/18 370/332 |
| 2015/0135082 A1* | 5/2015 | Slay, Jr. | H04L 67/20 715/736 |

* cited by examiner

AUTOMATIC INTERNET SHARING

TECHNICAL FIELD

The present application is directed to methods and systems of sharing an Internet connection between two devices without having to select a specific protocol or configuration.

BACKGROUND

Many mobile device users have more than one mobile device for which an Internet connection is desired. For example, a user may include a smartphone with Internet connectivity and a tablet computer that lacks Internet connectivity (e.g., a WiFi-only tablet, or a tablet that lacks a SIM card). It is possible to provide the desired Internet connectivity to the lacking device through either Wi-Fi tethering (e.g., configuring one of the devices as a so-called "hotspot") or Bluetooth tethering between the two devices. However, it is often difficult or cumbersome to set up the necessary tethering. Therefore, many users do not end up using tethering features.

One existing Bluetooth configuration process for tethering two devices includes the following: 1) enable Bluetooth on both devices; 2) make the first device visible; 3) communicate the Bluetooth name of the first device to the second device; 4) send a pairing request from the second device to the first device; 5) ensure that each of the devices accepts the pairing request; 6) locate tethering settings on the first device and enable Bluetooth tethering; and 7) from the second device, input an identifier corresponding to the first device and connect with it. This process is often too complicated and/or cumbersome to set up for users. If the steps are not performed properly, or are performed out of order, the tethering may not work between the devices.

Further, tethering is available through a variety of different methods (e.g., Bluetooth and WiFi tethering). Many users do not know the difference between the two methods when attempting to tether two devices. This may lead to further confusion during the configuration process, and may also lead to users being unable to connect the two devices together.

SUMMARY

The present application is directed to devices and methods of tethering first and second wireless communication devices to enable the second device to gain access to a packet data network through the first device.

One embodiment is directed to a method of tethering first and second wireless communication devices to enable the second device to gain access to a packet data network through the first device with the method being implemented by the first device. The method includes establishing a wireless connection between the first device and the packet data network (PDN). The method also includes sending and receiving tethering information with the second device using a third wireless interface. If the wireless connection with the PDN is through a first wireless interface, automatically establishing a tethered connection with the second device via a different second wireless interface and connecting the second device to the PDN through the second interface. If the wireless connection with the PDN is not through the first wireless interface, automatically establishing a tethered connection with the second device via the first wireless interface and connecting the second device to the PDN through the first interface.

The first device may determine the tethering connection with the second device based on just the wireless connection between the first device and the PDN, and the tethering information without receiving any additional user input.

The first device may maintain the wireless connection to the PDN while establishing the tethered connection with the second device.

The first device may be connected to the PDN through one of a WLAN interface and a cellular interface, the first device may be tethered to the second device through the other of the WLAN interface and the cellular interface, the sending and receiving the tethering information may be through a Near Field Communication interface.

The method may also include activating a computer program stored in memory of the first device and advertising connectivity to the PDN prior to sending and receiving tethering information with the second device.

The method may also include if the wireless connection with the PDN is through a WLAN interface, sending and receiving tethering information with the second device using Near Field Communication (NFC) and establishing a tethered connection with the second device via Bluetooth and connecting the second device to the PDN. If the wireless connection with the PDN is through a cellular interface, sending and receiving tethering information with the second device using NFC and establishing a tethered connection with the second device via WLAN and connecting the second device to the PDN.

The method may also include establishing the wireless connection between the first device and the PDN prior to sending and receiving tethering information with the second device.

Another embodiment is directed to a computer program product stored in a non-transitory computer-readable medium for tethering first and second wireless communication devices to enable the second device to gain access to a packet data network through the first device. The computer program product includes software instructions which, when run by a processor of the first device, configures the first device to perform the method of any one of aspects described above.

Another embodiment is directed to a wireless electronic device that includes a processor with one or more processing circuits configured to use the processor to implement the method of any of aspects described above.

Another embodiment is directed to a wireless electronic device that includes a control processor, a WLAN interface configured to connect to a router to access a packet data network (PDN), a cellular interface configured to connected to a mobile communication network to access the PDN, and a Near Field Communication (NFC) interface configured to communicate with a second device. The controller processor includes one or more processing circuits configured to: establish a wireless connection between the first device and the PDN using one of the interfaces; send and receive tethering information with a second device using a third one of the interfaces, if the wireless connection with the PDN is through a first one of the wireless interfaces, automatically establish a tethered connection with the second device via a second one of the interfaces and connecting the second device to the PDN through the second interface; and if the wireless connection with the PDN is through a second one of the wireless interfaces, automatically establish a tethered connection with the second device via the first interface and connecting the second device to the PDN through the first interface.

The device may device be configured to automatically establish the tethered connection without receiving an input for a tethering protocol or configuration.

The device may be configured to establish the wireless connection between the first device and the PDN via a first interface; if the wireless connection with the PDN is through the WLAN interface, send and receive tethering information with the second device using NFC and establish the tethered connection with the second device via Bluetooth and connect the second device to the PDN; and if the wireless connection with the PDN is through the cellular interface, send and receive tethering information with the second device using NFC and establish a tethered connection with the second device via WLAN and connect the second device to the PDN.

The device may also include a tethering utility configured to advertise the connectivity to the PDN prior to communicating with the second device.

The various aspects of the various embodiments may be used alone or in any combination, as is desired.

DETAILED DESCRIPTION

The present application is directed to methods of tethering first and second devices to enable the second device to tether to and gain access to a packet data network through the first device. The methods provide for an automatic sharing solution in which the user is not required to select the tethering protocol or wireless technology for connection to the network. The necessary settings to establish the connection to the network are setup automatically.

Figure 1:
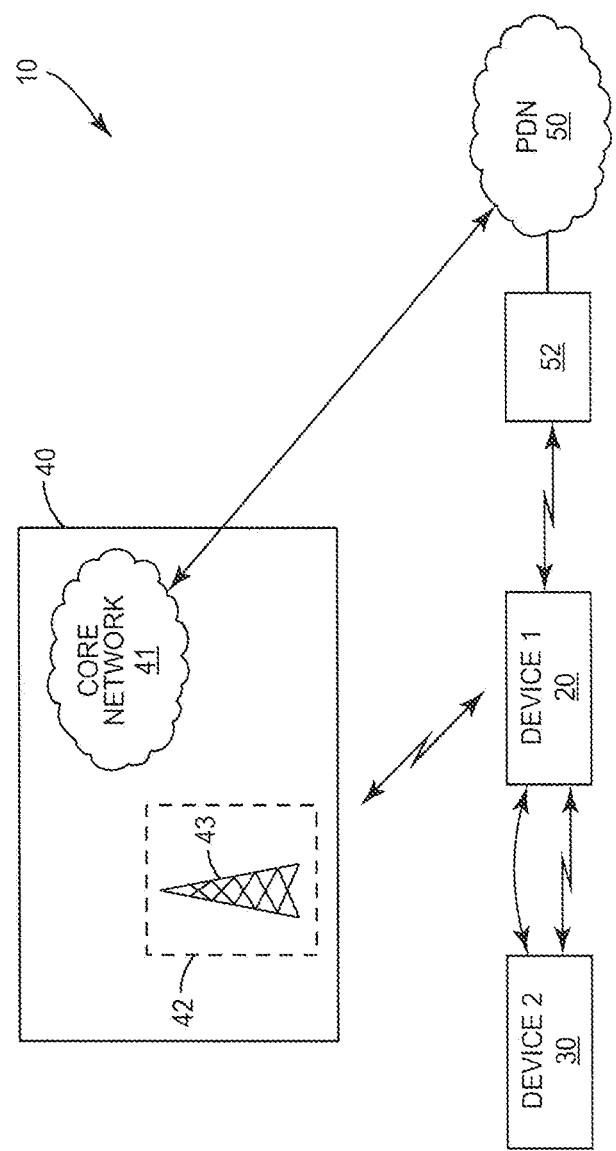
FIG. 1 is a schematic diagram of a wireless communication network offering a number of tethering options between first and second devices.

The present disclosure will be described in the context of an exemplary wireless communication network 10 shown in FIG. 1. The communication network 10 includes a mobile communication network (MCN) 40. The MCN 40 includes a core network 41 and a radio access network (RAN) 42 including one or more base stations 43. The mobile communication network 40 may be a conventional cellular network operating according to any communication standards now known or later developed. For example, the mobile communication network 40 may comprise a Wideband Code Division Multiple Access (WCDMA) network, a Long Term Evolution (LTE) network, or WiMAX network. The mobile communication network 40 provides access to a packet data network (PDN) 50. The packet data network 50 may comprise a public network such as the Internet, or a private network. In addition to being accessible through the MCN 40, the PDN 50 is also accessible via one or more routers 52 which, in one or more embodiments, operate according to the 802.11 family of standards, which is commonly referred to as WiFi.

Each of the first and second devices 20, 30 may include a variety of different embodiments, including but not limited to tablet computing devices (e.g., the iPAD, NOOK, KINDLE, etc.), laptop computing devices, ultra-mobile PCs, wearable computing devices, game consoles, Personal Digital Assistants (PDAs), cellular telephones including "Smartphones," or any other device equipped with wireless communication capabilities.

Figure 2:
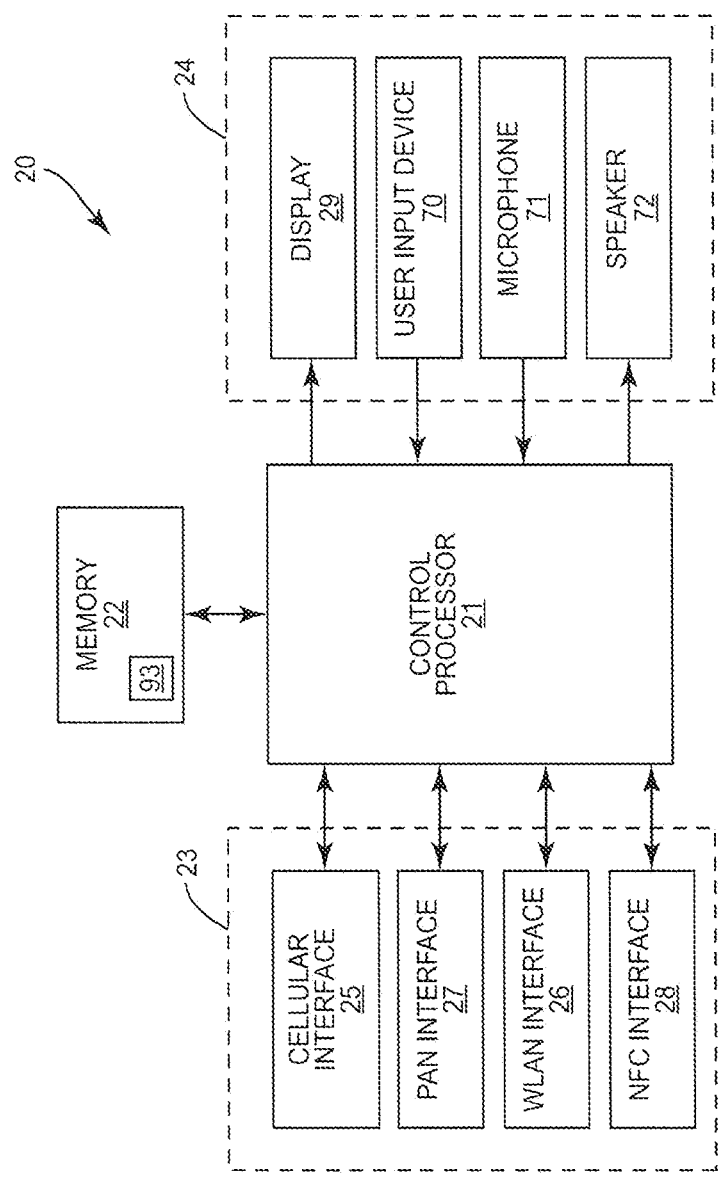
FIG. 2 is a schematic diagram of a first device that has connectivity to a packet data network.

FIG. 2 illustrates an exemplary first device 20 operative to provide a tethered connection to the PDN 50. The first device 20 includes a main control processor 21, memory circuit 22, communication circuit 23, and user interface 24. The main control processor 21 controls overall operation of the first device 20 according to program instructions stored in memory 22. The main control processor 21 may comprise one or more circuits, microcontrollers, microprocessors, hardware, or a combination thereof. Memory circuit 22 comprises a non-transitory computer readable storage medium storing program instructions, such as a computer program product, that configures the processor 21 to implement one or more of the techniques discussed herein. Memory circuit 35 may include various memory devices such as, for example, read-only memory, and flash memory.

The communications circuit 23 enables the first device 20 to communicate with other devices over communication networks. In the exemplary embodiment, the communications circuit 23 includes two separate interfaces referred to herein as the cellular interface 25 and WLAN interface 26. The cellular interface 25 enables the first device 20 to communicate with the mobile communication network 40 (e.g., a WCDMA, LTE, or WiMAX network). The WLAN interface 26 is configure to communicate with the router 52. An exemplary WLAN interface could operate according to the 802.11 family of standards, which is commonly known as a WiFi interface. The first device 20 may further include a personal area network (PAN) interface 27, such as a Bluetooth interface. The PAN interface 27 can be used to connect with a tethering device as will be explained in more detail below.

The communication circuit 23 also includes a Near Field Communication (NFC) interface 28. Near Field Communication is a short-range wireless connectivity technology that uses magnetic field induction to permit devices to share information with each other over short distances (e.g., on the order of 4 centimeters or less). Communication between two NFC-capable devices is possible when the devices are within close physical proximity to one another, and may be initiated when the devices are actually brought into contact with each other. The distance separating two NFC-capable devices is typically anywhere between about 0 and 4 centimeters, but in some instances can be up to about 20 centimeters. In the embodiment of FIG. 2, NFC interface 28 comprises an "active" transceiver circuit capable of communicating information and data with an external NFC-capable device. NFC interface 28 may include its own power supply, or may draw power from a battery associated with the device 20. Once the first and second devices 20, 30 are placed within close physical proximity, an NFC link can be established to facilitate a bi-directional data exchange between the two devices.

The user interface 24 enables a user to interact with and control the first device 20. The main components of the user interface include an electronic display 29, one or more user input devices 70, and optionally a microphone 71 and speaker 72. The main control processor 21 outputs information to the display 29 for viewing by the user, and receives user input via the user input devices 70. The user input devices 70 may comprise, for example, keypads and keyboards, input buttons, touch pads, joysticks, track balls, and other such devices for receiving input from a user. The electronic display 29 may comprise a touchscreen display that also functions as a user input device. Microphone 71 converts audible sounds into audio signals for input to the main control processor 21. Speaker 72 converts audio signals output by the main control processor 21 into audible sounds that can be heard by a user. The first device 20 may also have other additional features not illustrated in FIG. 2.

Figure 3:
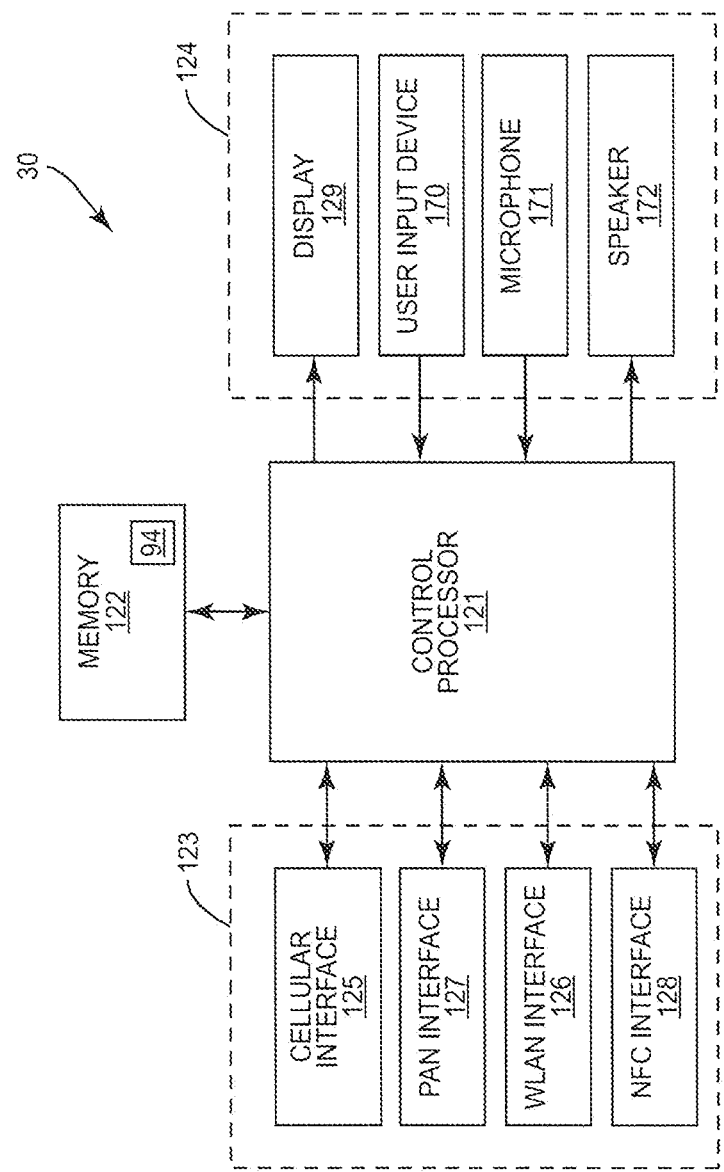
FIG. 3 is a schematic diagram of a second device that is configured to tether with a first device to provide access to a packet data network.

The second device 30 may include many of the same components as the first device 20. The second device 30 may or may not be able to independently connect to the packet data network 50. In one embodiment, the second device 30 is not able to connect to the PDN 50 because of a lack of a SIM card in the device 30. In one embodiment, the second device is excluded from connecting directly to the router 52 because of a whitelist or blacklist of the router 52. FIG. 3 illustrates the components of one embodiment of the second device 30. These are the same or similar to the first device 20, and include a control processor 121, memory circuit 122, communication circuit 123 that includes one or more cellular interface 125, PAN interface 127, WLAN interface 126, and NFC interface 128, and a user interface 124 that includes a display 128, input device 170, microphone 171, and speaker 172 as described above.

The present application provides for a method of providing a tethered connection to a PDN 50 via the first device 20. The first device 20 connects to the PDN 50 through one of two possible interfaces. Depending upon which interface is used for the connection, the first device 20 determines how to establish a tethered connection with the second device 30. Once determined, the first device 20 sends tethering setup information to the second device 30 for tethering via the best option. The best option is an interface that is not already in use by the first device 20. The first device 20 receives the setup information and provides the tethering connection for the second device 30.

Figure 4:
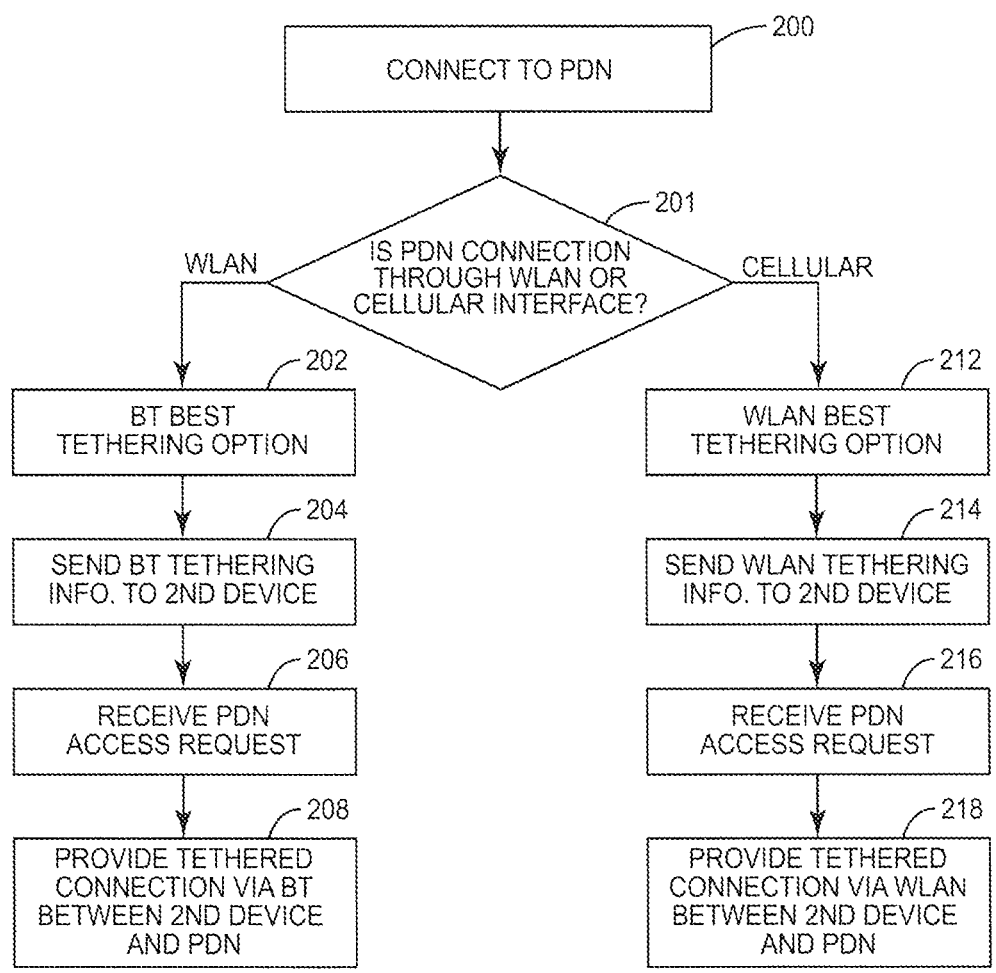
FIG. 4 is a flowchart diagram of a method of a second device tethering with a first device.

FIG. 4 illustrates one method of the first device 20 automatically determining which tethering option to use with the second device 30. The first device 20 may initially include one or more of the interfaces 25, 26, 27, 28 enabled. The second device 30 may initially include at least the NFC interface 128 being enabled.

The first device 20 connects to the PDN 50 through a first interface (block 200). In one embodiment, the connection may be using the WLAN interface 26 via the router 52, or using the cellular interface 25 via the MCN 40. The connection to the PDN 50 then dictates the tethering with the second device 30 such that the connection is maintained (block 201).

If the PDN connection is established through the WLAN interface 26, the first device 20 determines that Bluetooth is the best tethering option for the second device (block 202). The first device 20 enables its Bluetooth interface (if not already enabled) and sends tethering information to the second device 30 (block 204). The tethering information may include a command to enable Bluetooth, or to free Bluetooth if it is already in use. The tethering information may also include various identifying information necessary for the tethered connection. In one embodiment, the communication from the first device 20 to the second device 30 is through NFC.

The second device 30 may then enable its Bluetooth interface (of not already enabled) and send a request that is received by the first device 20 requesting PDN access via Bluetooth (step 206). A tethered connection between the second device 30 and the PDN 50 is then established via the first device 20 through Bluetooth (block 208).

If the PDN connection established at block 200 is a cellular connection through the MCN 40, the first device 20 determines that the best tethering option is using the WLAN interface 26 (block 212). In one or more embodiments, a WLAN connection is a preferred default connection in block 200, and the cellular connection through the MCN 40 is only established if it is not possible for the first device 20 to connect to the PDN 50 through a WLAN connection.

At each device 20, 30, the NFC interfaces 28, 128 are enabled. The first device 20 sends WLAN tethering information to the second device 30 (block 214). This may include a command to enable the WLAN interface 126 (which may include a command to terminate any existing use of the interface 126). The tethering information may also include various identifying information necessary for the tethered connection. Again, this information may be sent via NFC. If the WLAN interface 126 is not yet enabled, the second device 30 enables the WLAN interface 126. The first device 20 receives a request for PDN access (block 216). A tethered connection between the second device 30 and the PDN 50 is then established via the first device 20 (block 218).

To facilitate automatic tethering (i.e., automatic performance of blocks 201-218), each of the devices 20, 30 includes a tethering utility 93, 94 that facilitates the transfer of tethering connection information, and optionally also facilitates the enabling of necessary interfaces. Once the first and second devices 20, 30 transmit and/or obtain the requisite tethering information through the tethering utilities 93, 94, tethering between the devices 20, 30 may be automatically activated to allow for the second device 30 to connect to the PDN 50 through the first device 20.

In the various embodiments, the tethering utility 93 in the first device 20 is a computer program stored in the memory circuit 22 that is activated to advertise to nearby devices about the connectivity to the packet data network 50. In one embodiment, the user activates the host utility 93 using one or more input devices 70. In other embodiments, the host utility may already be activated (e.g., running as a service in the background). Once activated, a message may be included on the display 29 directing the user to move the first device 20 into proximity of the other device. The first device 20 then transmits tethering initiation data using the NFC interface 28 or PAN interface 27 for nearby devices (see blocks 204, 214).

In the various embodiments, tethering information is sent through NFC. The use of NFC is relatively secure since it works with the devices being in a very short range of one another. Because of the required proximity, the chance for intercepting the tethering information that is being transmitted between the devices 20, 30 is relatively small. The tethering information transferred between the devices 20, 30 via NFC may include but is not limited to the current PDN connection of the first device 20, the personal area networking capabilities of the devices 20, 30, and relevant credentials. The tethering information provides for the devices 20, 30 and facilitates establishment of a tethered connection, to extend a connection to PDN 50 through WLAN or Bluetooth interfaces, for example.

In one or more embodiments, the first device 20 is capable of a single connection through one or more of the interfaces (e.g., the WLAN interface 26), and cannot simultaneously connect to the PDN 50 using the WLAN interface 26 and support a WLAN tethering connection to the second device 30. Thus, the best tethering option available is based on how the first device 20 is already connected to the PDN 50.

In one or more embodiments, the second device 30 does not include the capability of independently accessing the PDN 50. In another embodiment, the second device 30 has the capability of accessing the PDN 50, but there may be a reason to connect through the first device 20 rather than independently. For example, the connection available independently may not be as robust as that available through the first device 20. Another context may provide for using the first device 20 as a measure to avoid using a cellular data plan and applicable data rates established for the second device 30.

In the embodiments described above, the first device 20 connects to the PDN 50 prior to tethering with the second device 30. However, it is understood that this is not necessary, and that the first device 20 could initiate a PDN connection upon request from the second device 30, such that the first device 20 initially exchange information via NFC with the second device 30 prior to establishing a PDN connection to be extended through tethering. This information indicates which interfaces are available for tethering. Once the first and second devices 20, 30 are tethered together through a supported interface, the first device 20 connects to the PDN 50 through a second interface that is not in use for the tethering. Once the first device 20 is connected to the PDN 50, the second device 30 is then able to access the PDN 50 through the first device 20 as described above.

The memory 22 associated with the control processor 21 is operative to store a software application (e.g., the tethering host utility 93) that provides for the first device 20 to tether with the second device 30 to enable the second device 30 to gain access to the PDN 50. The software application may have a variety of different formats, such as a dedicated application, or as a cached application downloaded through a web browser. The second device 30 also includes a similar program (e.g., the tethering client utility 94) stored in memory 122 that provides for the second device 30 to tether with the first device 20. The software application may also include a variety of different formats. In one or more embodiments, the two programs are the same (i.e., the same program can act as either host utility or client utility).

In one or more embodiments, the tethering connection between the devices 20, 30 is performed automatically by the first device 20. The user is not required to provide any additional inputs to provide for tethering connection, such as choosing the tethering protocol, or provide any of the settings or configurations for the protocols. This provides for the user to tether the devices 20, 30 in a straight-forward manner that is not cumbersome or complicated for the user, and does not require the user to know the difference between the various tethering options.

Those skilled in the art will readily recognize that the first and second devices 20, 30 may transmit tethering information using a variety of wireless communication protocols for communicating with in-range mobile communication devices. Examples include but are not limited to Ultra-WideBand (UWB), Institute of Electrical and Electronics Engineers (IEEE) 802.11 Wireless Fidelity (WiFi), IEEE 802.16 Worldwide Interoperability for Microwave Access (WiMax), Wireless Broadband (WiBro), Infrared (IrDA), Radio Frequency Identification (RFD), Near Field Communication (NFC), HiperLAN, HiperMAN, IEEE 802.20, IEEE 802.15.4 (ZigBee), or the like.

The present disclosure may be carried out in other ways than those specifically set forth herein without departing from essential characteristics of the disclosure. The present embodiments are to be considered in all respects as illustrative and not restrictive, and all changes coming within the meaning and equivalency range of the appended claims are intended to be embraced therein.

What is claimed is:

1. A method of tethering first and second wireless communication devices to enable the second device to gain access to a packet data network through the first device, the method being implemented by the first device and comprising:
   establishing a wireless connection between the first device and the packet data network (PDN),
   sending and receiving tethering information with the second device using a third wireless interface;
   if the wireless connection with the PDN is through a first wireless interface, automatically establishing a tethered connection with the second device via a different second wireless interface and connecting the second device to the PDN through the second interface;
   if the wireless connection with the PDN is not through the first wireless interface, automatically establishing a tethered connection with the second device via the first wireless interface and connecting the second device to the PDN through the first interface.

2. The method of claim 1, wherein the first device determines the tethering connection with the second device based on just the wireless connection between the first device and the PDN, and the tethering information without receiving any additional user input.

3. The method of claim 1, wherein the first device maintains the wireless connection to the PDN while establishing the tethered connection with the second device.

4. The method of claim 1, wherein the first device is connected to the PDN through one of a WLAN interface and a cellular interface, the first device is tethered to the second device through the other of the WLAN interface and the cellular interface, and sending and receiving the tethering information is through a Near Field Communication interface.

5. The method of claim 1, further comprising activating a computer program stored in memory of the first device and advertising connectivity to the PDN prior to sending and receiving tethering information with the second device.

6. The method of claim 1, further comprising:
   if the wireless connection with the PDN is through a WLAN interface, sending and receiving tethering information with the second device using Near Field Communication (NFC) and establishing a tethered connection with the second device via Bluetooth and connecting the second device to the PDN;
   if the wireless connection with the PDN is through a cellular interface, sending and receiving tethering information with the second device using NFC and establishing a tethered connection with the second device via WLAN and connecting the second device to the PDN.

7. The method of claim 1, further comprising establishing the wireless connection between the first device and the PDN prior to sending and receiving tethering information with the second device.

8. A wireless electronic device comprising:
   a control processor;
   a WLAN interface configured to connect to a router to access a packet data network (PDN);
   a cellular interface configured to connected to a mobile communication network to access the PDN;
   a Near Field Communication (NFC) interface configured to communicate with a second device;

wherein the controller processor comprises one or more processing circuits configured to;
    establish a wireless connection between the first device and the PDN using a first or second one of the interfaces;
    send and receive tethering information with a second device using a third one of the interfaces;
    if the wireless connection with the PDN is through the first wireless interface, automatically establish a tethered connection with the second device via the second interface and connect the second device to the PDN through the second interface;
    if the wireless connection with the PDN is through the second interface, automatically establish a tethered connection with the second device via the first interface and connect the second device to the PDN through the first interface.

9. The device of claim 8, wherein the device is configured to automatically establish the tethered connection without receiving an input for a tethering protocol or configuration.

10. The device of claim 8, wherein the device is further configured to:
    establish the wireless connection between the first device and the PDN via the first interface;
    if the wireless connection with the PDN is through the WLAN interface, send and receive tethering information with the second device using NFC and establish the tethered connection with the second device via Bluetooth and connect the second device to the PDN;
    if the wireless connection with the PDN is through the cellular interface, send and receive tethering information with the second device using NFC and establish the tethered connection with the second device via WLAN and connect the second device to the PDN.

11. The device of claim 8, further comprising a tethering utility configured to advertise the connectivity to the PDN prior to communicating with the second device.

12. A computer program product stored in a non-transitory computer-readable medium for tethering first and second wireless communication devices to enable the second device to gain access to a packet data network through the first device, the computer program product comprising software instructions which, when run by a processor of the first device, configures the first device to establish a wireless connection between the first device and the packet data network (PDN);
    send and receive tethering information with the second device using a third wireless interface;
    if the wireless connection with the PDN is through a first wireless interface, automatically establish a tethered connection with the second device via a different second wireless interface and connect the second device to the PDN through the second interface;
    if the wireless connection with the PDN is not through the first wireless interface, automatically establish a tethered connection with the second device via the first wireless interface and connect the second device to the PDN through the first interface.

13. A wireless electronic device comprising:
a processor with one or more processing circuits, the processing circuits configured to:
    establish a wireless connection between the first device and the packet data network (PDN);
    send and receive tethering information with the second device using a third wireless interface;
    if the wireless connection with the PDN is through a first wireless interface, automatically establish a tethered connection with the second device via a different second wireless interface and connect the second device to the PDN through the second interface;
    if the wireless connection with the PDN is not through the first wireless interface, automatically establish a tethered connection with the second device via the first wireless interface and connect the second device to the PDN through the first interface.

\* \* \* \* \*